April 6, 1937.  J. C. KARNES  2,075,854

PREDICTING DEVICE

Filed Feb. 13, 1935

Inventor
James C. Karnes
By W. N. Roach
Attorney

Patented Apr. 6, 1937

2,075,854

UNITED STATES PATENT OFFICE 2,075,854

PREDICTING DEVICE

James C. Karnes, Buffalo, N. Y.

Application February 13, 1935, Serial No. 6,355

3 Claims. (Cl. 33—1)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a predicting device.

In plotting the prediction or set-forward point of a moving target the present gunnery practice is to plot the course of a target on a map by marking the position of the target at stated intervals. In order to calculate the set-forward point representing the predicted future position of the target the time of flight of the projectile must be taken into consideration.

The purpose of this invention is to provide a predicting device for establishing the set-forward point which is simple and accurate in operation and which eliminated mental calculation, the setting of values, and the adjustment of movable parts.

A practical embodiment of the invention is illustrated in the accompanying drawing, wherein.

Figure 1:
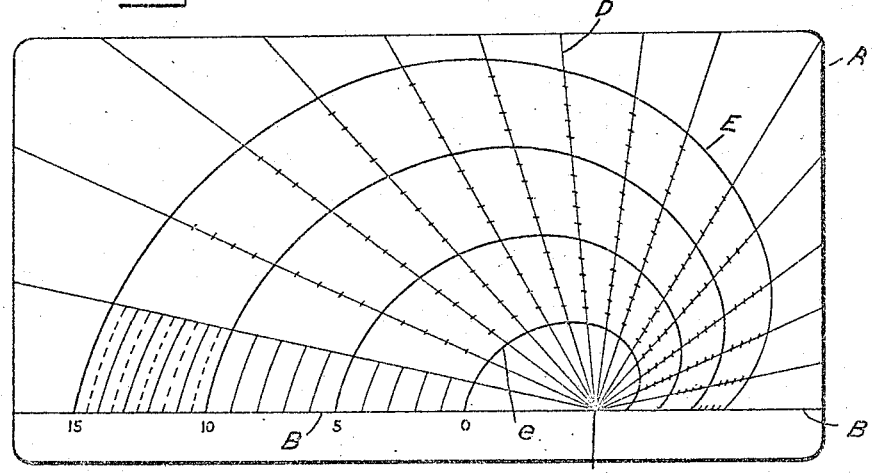
Fig. 1 is a plan view of a predicting device constructed in accordance with the invention.

Referring to Fig. 1, there is shown a transparent plate A on which is inscribed a base line B having a point C which will be referred to as a point of origin. A chart base on the point of origin consists of a series of radial lines D and curves E.

The first or smallest curve e is the origin curve and represents different distances of travel of a target for any predetermined observing interval, for example, five seconds. All points on the curve are at different distances from the origin C so that a large number of units of measure are provided to allow for the different speeds of the target. The remaining curves are multiplications of the origin curve e and are numbered from 1 to 15, commencing with the curve next to the origin curve e. These numbers designate seconds of time and represent the time of flight including the "dead" time of loading, determination of data, etc. These curves will be hereinafter referred to as time of flight curves.

Figure 2:
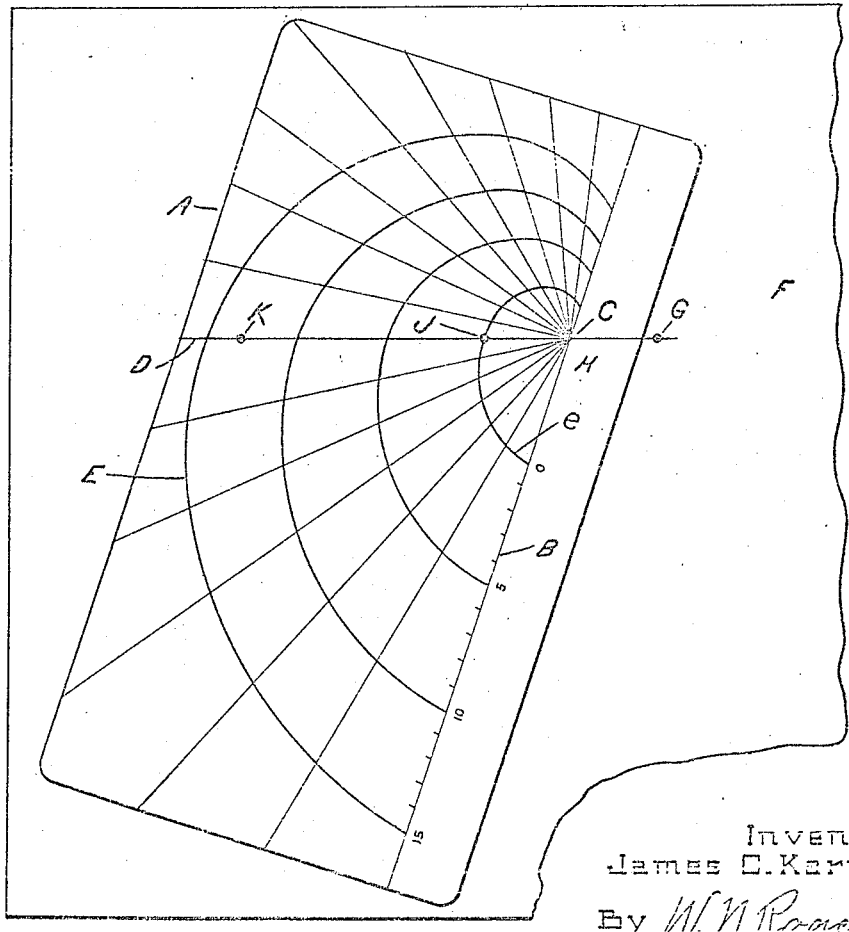
Fig. 2 is a similar view illustrating the manner of employing the predicting device.

Referring to Fig. 2 there is shown a sheet F on which the course of the target is plotted. The course of the target is represented by the points G, H, J which have been plotted at the stated observing interval of five seconds.

In employing the predicting device, the plate A is laid on the sheet F with the origin point C on the next to the last plotted point H. The plate A is now rotated about the point C as a center until the last plotted point J coincides with the origin curve e. The distance C—J is the unit of measure of the travel of the target during a period of five seconds.

The radial line D which passes through the point J represents the course of the target. The set-forward point or predicted future position lies on this radial line, the exact position depending on the time of flight. If this value is 13 seconds the set-forward point will be at K on the correspondingly designated curve E.

A separate chart must be provided for each observation interval.

While the device has been described as applied to a problem in gunnery it may be used in connection with other problems involving charts and graphs.

I claim.

1. A predicting device comprising a plate having an origin point, radial lines leading from said point, an origin curve plotted from the origin point and crossing the radial lines, said curve establishing different units of measure from the origin point and representing different distances of travel of a target for a stated interval of time and a plurality of curves establishing multiples of the units of measure established by the origin curve and marked in units of time from the origin curve outward.

2. A predicting device comprising a plate having an origin point, an origin curve plotted from the origin point, said curve establishing different units of measure from the origin point and representing different distances of travel of a target for a stated interval of time and a plurality of curves establishing multiples of the units of measure established by the origin curve and marked in units of time from the origin curve outward.

3. A predicting device comprising a plate having a reference, an arbitrary line all points of which are at different distances from the reference to establish a large number of units of measure and other lines establishing multiples of the units of measure established by the arbitrary line, said other lines being marked in units of time from the arbitrary line as an origin.

JAMES C. KARNES.